United States Patent [19]

Katsumata et al.

[11] Patent Number: 5,258,431
[45] Date of Patent: Nov. 2, 1993

[54] WEATHER-RESISTANT POLYACETAL RESIN COMPOSITIONS EXHIBITING REDUCED SURFACE GLOSS CHARACTERISTICS, AND MOLDED ARTICLES THEREOF

[75] Inventors: Toru Katsumata; Nobuyuki Matsunaga, both of Shizuoka, Japan

[73] Assignee: Polyplastics Co., Ltd., Osaka, Japan

[21] Appl. No.: 901,594

[22] Filed: Jun. 19, 1992

[30] Foreign Application Priority Data

Jun. 20, 1991 [JP] Japan .................. 3-148736

[51] Int. Cl.$^5$ .............. C08K 5/345; C08K 5/20; C08K 5/16; C08K 5/13; C08K 5/10
[52] U.S. Cl. ....................... 524/100; 524/91; 524/208; 524/291; 524/336; 524/337; 525/64; 525/902
[58] Field of Search ........... 524/208, 337, 100, 91, 524/291, 336; 525/64, 902

[56] References Cited

U.S. PATENT DOCUMENTS

| | | | |
|---|---|---|---|
| 4,473,679 | 9/1984 | Falk et al. | 525/70 |
| 4,894,416 | 1/1990 | Gallucci | 525/902 |
| 4,975,478 | 12/1990 | Okuda | 524/91 |
| 5,006,592 | 4/1991 | Oshima et al. | 525/64 |

FOREIGN PATENT DOCUMENTS

| | | |
|---|---|---|
| 0494534A3 | 7/1982 | European Pat. Off. |
| 0192356 | 8/1986 | European Pat. Off. |
| 0390146 | 10/1990 | European Pat. Off. |
| 0421723A2 | 4/1991 | European Pat. Off. |

*Primary Examiner*—Veronica P. Hoke
*Attorney, Agent, or Firm*—Nixon & Vanderhye

[57] ABSTRACT

Moldable weather-resistant polyacetal resin compositions exhibiting low surface gloss characteristics are a melt-blend of (A) 100 parts by weight of a polyacetal base resin, (B) between 0.01 to 5 parts by weight of a weather stabilizer, and (C) a surface gloss reducing effective amount of between 1 to 50 parts by weight of a core-shell polymer having a rubbery polymer as the core and a glassy vinyl copolymer having at least one oxygenic polar group as the shell. Molded articles formed of such polyacetal compositions exhibit weather-resistance properties and a reduced surface gloss of at least 35%. Moreover, the ability to imprint a grain-like appearance on the surfaces of the molded articles is enhanced.

12 Claims, No Drawings

WEATHER-RESISTANT POLYACETAL RESIN COMPOSITIONS EXHIBITING REDUCED SURFACE GLOSS CHARACTERISTICS, AND MOLDED ARTICLES THEREOF

RELATED APPLICATIONS

This application may be deemed to be related to copending U.S. application Ser. No. 07/813,271 filed on Dec. 24, 1991, entitled "Polyacetal Resin Compositions Exhibiting Reduced Surface Gloss Characteristics, Core-Shell Polymers Useful to Reduce the Surface Gloss Characteristics of Polyacetal Resin, and Molded Articles Thereof", the entire content of which is expressly incorporated hereinto by reference.

FIELD OF INVENTION

The present invention relates generally to the field of weather-resistant polyacetal resin compositions and to weather-resistant molded articles formed thereof. More particularly, the present invention relates to novel polyacetal compositions which, in preferred embodiments, are formed by melt-blending a polyacetal base resin, a weather (UV-light) stabilizer, and a particular core-shell polymer as a surface gloss-reducing agent. The compositions and molded articles according to this invention exhibit exceptional weather resistance and a reduced surface gloss while maintaining the excellent mechanical properties, frictional wear resistance and moldability characteristics inherent in polyacetal resins generally.

BACKGROUND AND SUMMARY OF THE INVENTION

Polyacetal resin is used in diverse fields as an engineering plastic due to its excellent physical properties, such as mechanical, electrical and chemical properties (e.g., chemical and heat resistances). However, the identification of new end-use applications for polyacetal resins often requires further property alterations and/or enhancements.

One such property that is needed when polyacetal resin is employed to form molded parts used for automotive trim or optical instruments is a relatively low surface gloss combined with good weather-resistance characteristics. A low surface gloss will thus reduce the light reflectivity property of the molded part. As a result, low surface gloss on molded parts will tend to cause less eye irritation (i.e., since less light will be reflected from the part's surface). Furthermore, low surface gloss on molded parts fabricated from engineering plastics tends to impart a more aesthetically pleasing high-grade appearance to the part. Since many of the components formed of such a resin are used as exterior parts which are exposed to potentially harmful UV-light and/or rain, good weather-resistance properties are also required.

An ability to "engineer" the surface gloss characteristics would also be beneficial in those instances where molded parts fabricated from polyacetal resin (which inherently exhibits a relatively high surface gloss) are used in cooperation with molded parts formed of other non-polyacetal resins. That is, it would be especially desirable to reduce the surface gloss of polyacetal resin to an extent where it is substantially equivalent to the molded parts of non-polyacetal resin in which it is cooperatively used. An inability to date to reduce the surface gloss of polyacetal resins by controlled amounts so that it is visually imperceptible with parts molded from non-polyacetal resins has thus been one barrier to using polyacetal resin in end-use applications (e.g., as parts for electric and electronic devices) where the polyacetal part will be visible. Furthermore, good weather-resistance characteristics are required since such parts may be exposed to outdoor environments.

Attempts in the past to reduce the inherently high surface gloss of polyacetal resins have included incorporating inorganic filler material, such as calcium carbonate, talc or calcium silicate, in a polyacetal base resin. However, large amounts of such inorganic filler material must typically be added to the polyacetal base resin before the desired low surface gloss appearance is realized. The addition of relatively large amounts of inorganic filler material, however, is disadvantageous since it has a tendency to reduce both the weather-resistance properties of the resin. Furthermore, relatively large amounts of inorganic filler material decreases the mechanical characteristics (especially elongation and toughness) normally associated with polyacetal resins. Thus, for example, the mechanical properties may be degraded by the addition of relatively large amounts of filler material to the point where molded parts of such a highly filler-loaded polyacetal resin breaks during assembly or when dropped.

It has also been a conventional practice to transfer or imprint a grained surface texture onto the surfaces of molded articles in an attempt to reduce the surface gloss characteristics. However, in the case of polyacetal resin, its inherently high surface gloss and high crystallinity make transfer and/or imprinting a grained surface texture difficult. Thus, inadequate results are achieved by such a technique.

Thus, what has been needed is a polyacetal resin composition having both reduced surface gloss and weather-resistance characteristics which can be "engineered" without affecting the desirable physical properties associated with polyacetal resin generally (e.g., elongation and toughness). It is towards fulfilling such a need that the present invention is directed.

Broadly the present invention is directed to polyacetal resin compositions and molded articles thereof which include a normally solid (i.e., at room (20° C.) temperature) polyacetal base resin, a weather (UV-light) stabilizer, and an effective surface gloss reducing amount of a core-shell polymer as a surface gloss reduction (SGR) agent. In this connection, the core-shell polymer which is employed as the SGR agent is one which has a rubbery polymer core and a glassy (amorphous) polymer shell comprised of a vinyl copolymer having an oxygenic polar group. In preferred embodiments, the low-gloss polyacetal resin compositions of this invention while include between 0.01 to 5 parts by weight of the weather stabilizer and, between 1 to 50 parts by weight of the core-shell polymer per 100 parts by weight of the polyacetal base resin.

Further aspects and advantages of this invention will become more clear from the following detailed description of the preferred exemplary embodiments thereof.

DETAILED DESCRIPTION OF THE PREFERRED EXEMPLARY EMBODIMENTS

A. The Polyacetal Base Resin

The polyacetal base resin that may be used in the compositions of the present invention is a normally solid,, high-molecular weight polymer mainly comprised of repeating oxymethylene (—CH$_2$O—) units. The polyacetal base resin may be either a polyoxymethylene homopolymer or a copolymer, terpolymer or block copolymer containing a small amount of other monomeric units in addition to oxymethylene units. The polyacetal resin may be linear, branched or crosslinked. Furthermore, the degree of polymerization of the polyacetal resin is not particularly limited, provide that it is normally solid (i.e., is a solid at room (20° C.) temperature).

B. The Weather Stabilizer

The weather stabilizer that may be used in the compositions of the present invention may be one or more compounds selected from the group consisting of (1) benzotriazole derivatives, (2) benzophenone derivatives, (3) oxanilide derivatives, (4) aromatic benzoates, (5) cyanoacrylates and (6) hindered amines.

Specific examples of preferred benzotriazole derivatives (1) include

2(2'-hydroxy-5'-methyl-phenyl)benzotriazole,
2-(2'-hydroxy-3',5'-di-t-butyl-phenyl)benzotriazole;
2-(3,5-di-t-t-amyl-2-hydroxyphenyl)benzotriazole,
2-(2'-hydroxy-3',5'-di-isoamylphenyl)benzotriazole,
2-[2-hydroxy-3,5-bis-($\alpha$,$\alpha$-dimethylbenzyl)phemyl]-benzotriazole and
2-(2'-hydroxy-4'-octoxyphenyl)-benzotriazole.

Examples of preferred benzophenone derivatives (2) include 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4-4'-dimethoxybenzophenone, 2-hydroxy-4-methoxy-5-sufobenzophenone and 2-hydroxy-4-oxybenzylbenzophenone.

Examples of preferred oxanilide derivatives (3) include N-(2-ethyl-phenyl)-N'-(2-ethoxy-5-t-butylphenyl)oxamide and N-(2-ethyl-phenyl)-N'-(2-ethoxy-phenyl)oxamide.

Examples of preferred aromatic benzoates (4) include p-t-butylphenyl salicylate and p-octylphenyl salicylate.

Examples of preferred cyanoacrylates (5) include 2-ethylhexyl 2-cyano-3,3-diphenylacrylate and ethyl 2-cyano-3,3-diphenylacrylate.

Examples of preferred hindered amines (6) include piperidine derivatives having a stearic hindrance group, such as 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloxy-2,2,6,6-tetramehtylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenylcarbamoyloxy)-2,2,6,6-tetramethylpiperidine, bis(2,2,6,6-tetramethyl-4-piperidyl) oxalate, bis(2,2,6,6-tetramethyl-4-piperidyl) malonate, bis(2,2,6,6-tetramethyl-4-piperidyl) adipate, bis(2,2,6,6-tetramethyl-4-piperidyl) sebacate, bis(1,2,2,6,6-pentamethyl-4-piperidyl) sebacate, bis(2,2,6,6-tetramethyl-4-piperidyl) terephthalate, 1,2-bis(2,2,6,6-tetramethyl-4-piperidyloxy)ethane, bis(2,2,6,6-tetramethyl-4-piperidyl)hexamethylene 1,6-dicarbamate, bis(1-methyl-2,2,6,6-tetramethyl-4-piperidyl) adipate and tris(2,2,6,6-tetramethyl-4-piperidyl)benzene-1,3,5-tricarboxylate. In addition, piperidine derivative polycondensates are also usable in the present invention.

One or more than one of the above-described weather stabilizers may be employed. It is preferable to use weather stabilizers selected from among the above-mentioned compounds (1) to (5) together with one or more hindered amine compound (6), more preferable to use a benzotriazole derivative (1) together with a hindered amine compound (6).

The above-mentioned weather stabilizers may be used in an amount from 0.01 to 5 parts by weight, preferably from 0.02 to 3 parts by weight, per 100 parts by weight of the polyacetal base resin. When the content of the weather stabilizer is excessively small, the desired weather-resistance effects cannot be achieved. On the other hand, an excessively large content of such weather stabilizers is both economically disadvantageous, as well as causing deterioration of mechanical properties and mold staining.

C. The Core-Shell Polymer

The preferred core-shell polymers that may be employed as component (C) in the compositions of this invention are preferably those described more fully in the above-mentioned U.S. application Ser. No. 07/813,271 filed on Dec. 24, 1991. In this connection, the core-shell polymer according to the present invention includes a rubbery polymer core and a glassy (amorphous) polymer shell comprised of a vinyl copolymer having an oxygenic polar group. The core-shell polymer can be produced by a serial multi-stage emulsion polymerization process in which a polymer formed in the preceding stage is covered with a polymer formed in the following stage. It is preferred that, in the seed particle-forming stage, the monomer, surfactant and water be fed to the reactor prior to addition to an initiator which initiates the emulsion polymerization reaction.

The first stage polymerization according to the present invention is the stage which forms the rubbery core of the core-shell polymer. In this connection, the monomers that may be employed in the first stage polymerization include conjugated dienes and alkyl acrylates containing 2 to 8 carbon atoms in the alkyl moiety, as well as mixtures thereof. These preferred monomers are thus polymerized in the first stage of the emulsion polymerization process so as to yield the rubbery polymer having a glass transition temperature of $-20°$ C. or less which will constitute the core of the core-shell polymer.

Specific examples of conjugated dienes that may be employed as the monomer in the first stage polymerization include butadiene, isoprene, and chloroprene. On the other hand, specific examples of alkyl acrylates having 2 to 8 carbon atoms in the alkyl moiety that can be employed as monomers in the first stage polymerization include ethyl acrylate, propyl acrylate, butyl acrylate, cyclohexyl acrylate, 2-ethylhexyl acrylate and the like. Butyl acrylate, however, is particularly preferred.

Auxiliary comonomers copolymerizable with the conjugated dienes and/or alkyl acrylates can also be employed in the first stage polymerization. Examples of such auxiliary comonomers include various aromatic vinyl or vinylidene compounds (such as styrene, vinyltoluene, $\alpha$-methylstyrene, and the like), vinyl or vinylidene cyanide compounds (such as acrylonitrile, methacrylonitrile and the like), and alkyl methacrylates (such as methyl methacrylate, butyl methacrylate and the like).

When the first stage polymerization system does not contain a conjugated diene or, if it does but only in a proportion not exceeding 20 wt. % of the total monomer content in the first stage, then improved impact strength properties can be obtained by incorporating minor (but effective) amounts of a cross-linking monomer and/or a grafting monomer. Examples of suitable cross-linking monomers include, among others, aromatic divinyl monomers such divinylbenzene, and alkane polyol polyacrylates or polymethacrylates such as ethylene glycol diacrylate, ethylene glycol dimethacrylate, butylene glycol diacrylate, hexanediol diacrylate, hexanediol dimethacrylate, oligoethylene glycol diacrylate, olioethylene glycol (di)acrylate, trimethylolpropane dimethacrylate, trimethylolpropane triacrylate, trimethylolpropane trimethacrylate, and the like. Particularly preferred are butylene glycol diacrylate and hexanediol diacrylate.

Examples of grafting monomers that may be included in the first stage polymerization system include, among others, allyl esters of unsaturated carboxylic acids, such as allyl acrylate, allyl methacrylate, diallyl maleate, diallyl fumarate, diallyl itaconate and the like. Of these, allyl methacrylate is particularly preferred.

The cross-linking monomer and/or grafting monomer, if used, are present in the first stage polymerization system in an amount up to about 5 weight percent, and preferably between 0.1 to 2 weight percent each, based on the total monomer weight.

The core content in the core-shell polymer is most preferably between 50 to 90% by weight, based on the total weight of the core-shell polymer. When the core content is less than or exceeds the limits 50 wt. % and 90 wt. %, respectively, the mechanical properties obtained by blending the core-shell polymer and a polyacetal base resin are typically unsatisfactory.

The shell phase of the core-shell polymer that is employed in the compositions according to the present invention is especially characterized by a glassy (amorphous) polymer comprised of a vinyl copolymer having an oxygenic polar group and having a glass transition temperature of 40° C. or above. In this connection, core-shell polymers which do not have the requisite oxygenic polar group do not impart a sufficient matting (gloss-reducing) effect upon polyacetal base resin. Likewise, minimal (if any) gloss reduction is achieved when vinyl polymers not having a core-shell structure but having at least one oxygenic polar group are blended with polyacetal base resin.

The term "oxygenic polar group" is intended to amido (—CONH—), imido (—CONHC—) and nitro (—NO$_2$) groups. However, two or more hydroxy (alcohol) groups as the oxygenic polar groups are especially preferred.

A preferred monomer that may be employed in the final-stage polymerization to form the vinyl polymer having at least one oxygenic polar group may be, for example, (meth)acrylate of an alcohol, the alcohol having two or more oxygenic polar groups, for example, (meth)acrylates of alcohols having hydroxyl groups and/or glycidyl groups. In this connection, specific examples of (meth)acrylates of alcohol having hydroxyl groups include hydroxyethyl (meth)acrylate and hydroxypropyl (meth)acrylate, among which hydroxyethyl methacrylate is preferred. Specific examples of (meth)acrylates of alcohols having a glycidyl group include glycidyl acrylate and glycidyl methacrylate, of which the latter is preferred.

Furthermore, vinyl monomers having an oxygenic polar group other than the (meth)acrylates described above may be employed. For example, allyloxyethanol or allyl glycidyl ether may also be used as a comonomer to form the vinyl polymer forming the shell of the core-shell polymer according to this invention.

The monomers constituting the glassy polymer together with the above-noted monomer having an oxygenic polar group include alkyl (meth)acrylates such as methyl(meth)acrylate, ethyl (meth)acrylate, butyl (meth)acrylate, and the like, aromatic vinyl or vinylidene compounds such as styrene, vinyltoluene α-methylstyrene and the like, and vinyl or vinylidene cyanides such as acrylonitrile methacrylo-nitrile and the like. Particularly preferred are methyl methacrylate and styrene/acrylonitrile.

The content of the shell phase in the core-shell polymer preferably ranges between 10 to 50% by weight, based on the total weight of the core-shell polymer. When the shell phase content is less than 10 wt. %, insufficient weather-resistance is obtained. On the other hand, when the shell phase content exceeds 50 wt. %, it is sometimes observed that the resin composition obtained by melt-blending the core-shell polymer with a polyacetal base resin has poor mechanical properties.

An intermediate phase may be interposed between the first-stage polymer phase and the final-stage polymer phase, if desired. The intermediate phase, if present, can be provided by subjecting a polymerizable monomer having functional groups, such as glycidyl methacrylate, methacrylic acid, hydroxyethyl methacrylate, and the like, a polymerizable monomer forming a glassy polymer such methyl methacrylate, or a polymerizable monomer forming a rubbery polymer, such as butyl acrylate, to polymerization conditions in an intermediate emulsion polymerization stage.

The intermediate phase may be selected among various phase types depending on the desired properties of the core-shell polymer. Furthermore, the extent of polymerization of the intermediate phase may optionally be selected depending on the monomer that is employed. When a glass-like polymer is used as an intermediate phase, for example, the extent of its polymerization may be calculated as being a part of the shell. On the other hand, when a rubbery polymer is used as the intermediate phase, its degree of polymerization may be calculated as being a part of the core.

A variety of intermediate phase morphologies can be selected according to the properties that are desired for the resulting core-shell polymer. In this regard, core-shell polymer having such an intermediate phase may, for example, be a multilayer system in which the intermediate phase in interposed as a layer between the core and shell polymers, or as a "salami-like" system in which the intermediate phase is dispersed as small particles throughout the core polymer. In this latter morphology, the intermediate phase may form a new sub-core in the center of the core polymer as is sometimes the case when styrene or the like is used as the intermediate phase-forming monomer.

The use of a core-shell polymer having an intermediate phase may result in improvements in the impact strength and heat-distortion temperature, as well as enhancements in the flexural modulus. In addition, improved appearance characteristics of the core-shell polymer as a result of the presence of the intermediate phase may result due to decreased molding delamination and reduced pearlescence and color variations because of refractive index changes in the resulting molded articles.

The emulsion polymerization according to the present invention is preferably carried out using a surfactant, such as a nonionic surfactant or an oligomeric anionic or nonionic surface, as well as a polymerization initiator, such as an azo or peroxide polymerization initiator.

A number of well known surfactants that are commonly used in emulsion polymerization processes generally can also be employed in the emulsion polymerization process according to this invention. Thus, for example, nonionic ether type surfactants such as polyoxyethylene nonylphenyl ether, polyoxyethylene stearyl ether, polyoxyethylene lauryl ether, and the like; nonionic ester type surfactants such as polyoxyethylene monostearate and the like; nonionic sorbitan ester type surfactants, such as polyoxyethylene sorbitan monolaurate and the like; and nonionic block copolymer type surfactants such as polyoxyethylene polyoxypropylene block copolymers and the like may satisfactorily be employed.

The preferred surfactants to be used in the processes of this invention, however, are oligomeric anionic or nonionic surfactants such as those which have been used in emulsion polymerization reactions for certain specialized purposes. For example, oligomeric surfactants of the following formula (and which are described in Japanese Patent Publication Nos. 34832/1972, 34833/1972 and 38080/1972, the entirety of each being expressly incorporated hereinto by reference) can be employed in the emulsion polymerization process of this invention:

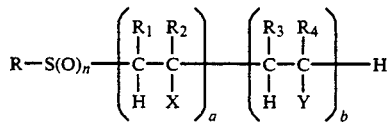

wherein the structural units represented by the formulas:

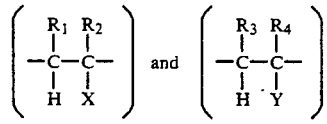

are randomly arranged in the surfactant's molecule, and wherein R represents an alkyl group of 5 to 20 carbon atoms, preferably 6 to 12 carbon atoms; n is 0, 1 or 2, and preferably 0 or 1, and more preferably 0; $R_1$ and $R_3$, which may be the same or different, represent —H, —CH$_3$, —C$_2$H$_5$, or —COOH; $R_2$ and $R_4$ which may be the same or different, represent —H, —CH$_3$, —C$_2$H$_5$, —COOH or —CH$_2$COOH; X represents —COOH, CONH$_2$, —OCH, or —OC$_2$H$_5$; and Y represents —CH$_2$OH,

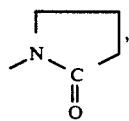

—CONH$_2$,    —COOC$_2$H$_4$OH,    —COOC$_2$H$_6$OH,
—CONHCH$_2$OH,    —CONHCH$_3$,    —CONHC$_2$H$_5$,
—CONHC$_3$H$_7$,    —COOHCH$_3$,    —COOC$_2$H$_5$,    —CN,
—OCOCH$_3$,    —OCOC$_2$H$_5$ or

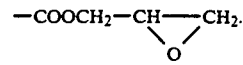

The molecular weight of the oligomeric surfactant to be used in accordance with the present invention is between about 200 to 5000, and preferably between about 1500 to 3000, with the degree of polymerization (a+b) ranging from about 6 to about 50.

The core-shell polymer described above is present in the composition of the present invention in an amount between 1 to 50 parts by weight, and preferably between 3 to 20 parts by weight, per 100 parts by weight of the polyacetal base resin. If the amount of the core-shell polymer is too small, insufficient reduction of the surface gloss will ensue. On the other hand, if the amount of the core-shell polymer is excessive, the mechanical properties, particularly stiffness, will be adversely affected. In addition, excessive amounts of the core-shell polymer will impart detrimental effects upon the compositions' heat stability characteristics.

According to the present invention, a polyacetal base resin is melt-blended with a core-shell polymer and a weather stabilizer as described above so as to obtain a polyacetal composition exhibiting reduced surface gloss (i.e., due to the presence of the core-shell polymer) and improved weather-resistance (i.e., due to the presence of the weather stabilizer). An aesthetically pleasing, high grade molded article formed of such a resin composition can thus be obtained. In addition, the improved properties attributable to the core-shell polymer and weather stabilizer are achieved without sacrificing the excellent mechanical properties inherent in polyacetal resins.

Similarly, molded articles formed from the polyacetal compositions of this invention not only exhibit uniformly lower surface gloss and high-grade appearance characteristics, but also retain the excellent mechanical properties that are inherent in polyacetal resin. The reasons why these effects are obtained are not fully understood at this time. However, without wishing to be bound to any particular theory, it is surmised that the core-shell polymer is dispersed in the surface region of the molded article in the form of particles having a size between 0.5 to 2.0 μm. As a result, the surface of the article is roughened by the presence of these core-shell polymer particles. In addition, the oxygenic polar groups are uniformly dispersed on the surface of the article so that its surface appearance is modified resulting in lower surface gloss.

The compositions of this invention preferably exhibit a surface gloss of 30% or less, more preferably 25% or less, and most preferably 20% or less, as determined at a reflection angle of 45°–45° according to JIS K 7105.

In recent years, most interior automotive trim components are leather- or stain-grained so as to improve the texture and to impart a high-grade "natural" appearance to the component. It is therefore required that such components exhibit a reduced specular surface gloss as well as improved grain surface transferability. In this regard, conventional polyacetal resins have poor grain-transfer properties, apparently due to the high crystallization which polyacetal resins possess. As a result, little (if any) surface gloss reduction typically ensues when a grain texture is transferred to the surface of a conventional polyacetal resin. The compositions according to the present invention, however, show remarkably improved gloss-reduction and surface grain-transfer properties.

Preferred examples of molded articles that can be formed of the polyacetal resin compositions of this invention include virtually any article where it is desirable or necessary to have a grained surface. Thus, molded articles according to the present invention can be produced by injecting a melt of the polyacetal resin composition into a mold cavity whose surfaces have the requisite graining, such that upon solidification of the polyacetal resin composition and removal from the mold, an article whose surface is grained will be obtained. Such "grained molded articles" include any article whose surface is entirely or partially grained (obtained by a suitable mold cavity whose surfaces are entirely or partially grained). Graining of the mold cavity surfaces can be achieved in any conventional manner, for example, by chemical etching, or electric arc machining. The relative roughness and texture of the graining may be selected as desired depending on the appearance of the final molded product.

The compositions of this invention may also contain coloring agents selected from the following exemplary dyes and pigments which are conventionally employed as colorants for thermoplastic resins. In this connection, anthraquinone dyes are preferable as dyes, while pigments may preferably be selected from among carbon black, azo pigments, phthalodyanine pigments, perylene pigments, quinacridone pigments, anthraquinone pigments, indoline pigments, titanium pigments, iron oxide pigments and cobalt pigments. These colorants may be used alone or in combinations of two or more of the same.

The addition of carbon black as a colorant in the compositions of this invention is especially effective to further enhance the weather-resistance properties of the composition. Suitable carbon black is available from a number of commercial sources, such as Micronex, Acetylene Black or Ketjen Black.

The content of the colorant that may be employed in the compositions of this invention is preferable between 0.1 to 10 parts by weight, and more preferably between 0.3 to 3 parts by weight, per 100 parts by weight of the polyacetal base resin. When the colorant content is less than 0.1 part by weight, insufficient coloring effects are realized. On the other hand, excessive amounts of colorant greater than 10 parts by weight is unnecessary in order to achieve the desired color characteristics and may contribute to deterioration of the composition's physical properties and heat-stability.

It is desirable that the compositions of this invention may include known heat stabilizers so as to improve the heat stability of the resulting composition. In this connection, it is desirable to use one or more stabilizers selected from among known antioxidants, nitrogen-containing compounds, and alkali or alkaline earth metal compounds.

The compositions of the present invention may further contain known additives that are conventionally incorporated into thermoplastic engineering resins so as to impart desired property characteristics to the resin. Examples of such conventional additive include, for example, lubricants nucleating agents, mold-release agents, antistatic agents, surfactants, organic polymers (other than the core-shell polymer described above), inorganic or organic fibrous, powdery or plate-like fillers and mixtures thereof.

The compositions of the present invention can be prepared by conventional processes for preparing synthetic resin compositions using conventional processing equipment. For example, the necessary components may be mixed together, kneaded and extruded with a single- or twin-screw extruder to provide pellets, followed by molding of the pellets to form articles. Alternatively, the composition may be prepared by adding all components to a molding machine so that melt-blending occurs simultaneously with molding to form articles. Further, a part or the entirety of the resin components may be pulverized and mixed with the residual components, followed by melt-extrusion to provide pellets. The pellets may then be employed to form molded articles. The above-noted optional stabilizers and additives may arbitrarily be added in any process step prior to the production of a final molded article.

The compositions of this invention can be molded using virtually any molding technique conventionally employed for thermoplastic resins generally, such as injection, extrusion, vacuum, blow, or foam molding techniques.

The polyacetal compositions of the present invention exhibit significantly improved effects in terms of improved weather-resistance properties, as well as reduced surface gloss characteristics by virtue of the presence of the core-shell polymer, without detrimentally affecting the inherent physical and mechanical properties that are attributable to the polyacetal base resin. Accordingly, weather-resistant molded articles having satisfactory physical and mechanical properties can be provided with "engineered" surface gloss characteristics.

As a result, molded articles formed of the compositions of this invention may suitably be employed in a number of end-use applications, for example, as automotive interior trim parts (which require a high-grade appearance, low light reflectivity, and good weather-resistance properties) such as regulator handles, interior clips, and ventilator knobs). In addition, the compositions of this invention may be used to form molded components for optical instruments, building materials, and household goods.

Further aspects and advantages of this invention will become more clear after careful consideration is given to the following non-limiting Examples.

EXAMPLES

In the following Examples, all components are expressed in parts by weight, and the following abbreviations have been used:

| Component | Abbreviation |
|---|---|
| ethyl acrylate | EA |
| methyl methacrylate | MMA |
| butyl acrylate | BA |
| 1,4-butylene glycol acrylate | BGA |
| allyl methacrylate | AlMA |
| methacrylamide | MAM |
| nonionic surfactant (polyoxyethylene nonylphenyl ether, Emulgen 950, Kao Corporation) | E950 |
| 2,2'-azobis(2-aminopropane dihydrochloride (V50, Wako Pure Chemical Industries, Ltd.) | V50 |
| 2-hydroxyethyl methacrylate | HEMA |
| styrene | St |

-continued

| Component | Abbreviation |
|---|---|
| glycidyl methacrylate | GMA |
| polyacetal resin | POM |
| n-dodecyl mercaptan | nDMP |
| azobisisobutyronitrile | AIBN |
| oligomeric anionic surfactant | surfactant A |

The oligomeric anionic surfactant designated "Surfactant A" had the following formula and was synthesized as in Example 13 of Japanese Kokai Patent Application No. 53-10682 (the entire content of which is incorporated fully hereinto by reference), adjusted to pH 7.5 with aqueous ammonia and diluted with purified water to make a solid content of 10%:

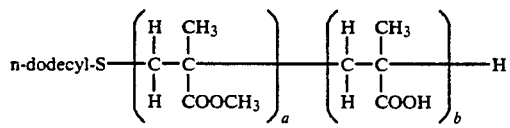

(wherein a:b=3:7, a+b=13.6, and molecular weight=1310)

| Composition | Amount |
|---|---|
| methacrylic acid | 155 g |
| MMA | 360 g |
| n-DMP | 109 g |
| AIBN | 4.4 g |
| isopropyl alcohol | 314 g |

Production Examples 1 to 3 (Production of Core-Shell Polymers C-1 to C-3)

1200 g of DIW, 1.68 g of 25% aqueous ammonia, 7 g of surfactant A and 0.14 g of MAM were charged into a 5 liter polymerization reactor equipped with a reflux condenser. The reactor charge was heated to 70° C. under a stream of nitrogen while being stirred. 27.86 g. of a seed monomer mixture of the following composition was then added and dispersed over 10 minutes, followed by the addition of 21 g of a 10% aqueous solution of V50 to initiate seeded polymerization:

| Seed Monomers | Amount |
|---|---|
| EA | 27.664 g |
| AlMA | 0.14 g |
| BGA | 0.056 g |

After 7 g of MAM were added, a monomer emulsion prepared by adding 210 g of surfactant A, 900 g of DIW and 2.80 g of 25% aqueous ammonia to 1365 g of a core monomer mixture of the following composition and a mixture of 21.0 g of a 10% aqueous solution of V50 and 0.63 g of 1% aqueous ammonia were continuously fed over a period of 180 minutes for further seeded polymerization:

| Core Monomer Mixture: | |
|---|---|
| Component | Amount |
| BA | 1215.2 g |
| MMA | 140.0 g |
| BGA | 2.8 g |
| AlMA | 7.0 g |

The reaction mixture was heated to 80° C., aged for one hour and cooled to 70° C., after which, 9 g of a 10% aqueous solution of V50 and 0.27 g of 1% aqueous ammonia were added to the reactor. A shell monomer emulsion of the following composition, 12 g of a 10% aqueous solution of V50 and 0.36 g of 1% aqueous ammonia were continuously fed thereinto over 60 minutes for further seeded polymerization:

| Shell Monomer Emulsion: | |
|---|---|
| Component | Amount |
| MMA | 265.8 g |
| EA | 60.0 g |
| Surfactant A | 30.0 g |
| DIW | 500.0 g |
| 25% aqueous ammonia | 0.72 g |
| St | 180.0 g |
| HEMA | 90.0 g |
| BGA | 1.2 g |
| MAM | 3.0 g |

The reaction mixture was heated to 80° C., aged for one hour, cooled, and filtered through a 300-mesh stainless steel screen to yield a core-shell polymer latex.

The latex was frozen at −15° C., thawed to room temperature and filtered through a glass filter. The filter cake was dried in an air current at 60° C. for 24 hours to give the core-shell polymer C-1.

The procedures noted above were repeated except that each monomer as specified in Table 1 was used to thereby obtain core-shell polymers C-2 and C-3.

In all cases, 35 grams of the core monomer mixture was employed as the seed monomer.

TABLE 1

| Monomer composition (part by weight) | Core shell polymer (symbol) | |
|---|---|---|
| | C-2 | C-3 |
| Core | | |
| BA | 1243.2 | 1250.2 |
| MMA | 140.0 | 140.0 |
| BGA | 2.8 | 2.8 |
| AlMA | 14.0 | 7.0 |
| Shell | | |
| MMA | 448.8 | 478.8 |
| EA | 60.0 | 60.0 |
| GMA | — | 60.0 |
| HEMA | 90.0 | — |
| BGA | 1.2 | 1.2 |

The following evaluation techniques were used to obtain the data appearing in the Tables below:

(1) Determination of Surface Appearance and Surface Gloss Characteristics

A test piece (70mm×40mm×30mm) prepared by molding each composition in a specular or a grained mold under the following conditions was examined for surface appearance and surface gloss characteristics:

| Molding Machine: | Toshiba Corporation, IS 80 | | | |
|---|---|---|---|---|
| Molding Conditions: | | | | |
| | nozzle | C1 | C2 | C3 |
| cylinder temp. (°C.) | 200 | 190 | 180 | 160 |
| injection pressure | 650 kg/cm² | | | |
| injection speed | 1.0 m/min | | | |
| mold temp. (°C.) | 80 | | | |

(i) Surface Appearance: The surface appearance was evaluated in terms of dullness and surface uniformity and classified subjectively into the following four ranks, whereby the lesser ranking means better dullness and higher uniformity

| Rank | |
|---|---|
| 1 | Surface is uniformly rough and no outline of a fluorescent illuminating lamp is visible on the surface |
| 2 | the surface is nonuniformly rough, but no outline of the illuminating lamp is observed |
| 3 | an obscure outline of the lamp is perceptible |
| 4 | a clear outline of the lamp is perceptible, and the surface is nearly smooth |

(ii) Surface Gloss: The surface gloss was determined at a reflection of 45°-45° according to JIS K 7105 using a digital glossmeter of the variable angle type manufactured by Suga Test Instruments Co., Ltd., UGV-40.

(2) Weatherability Test

A test piece was irradiated with ultraviolet (UV) light with the sue of an ultraviolet light fadeometer (model FAL-AU H B em, manufactured by Suga Test Instruments Co., Ltd.) at a black panel temperature of 83° C. The crack initiation time was then measured and changes in surface conditions were evaluated.

(i) Crack Initiation Time: A test piece was irradiated with UV light under the conditions stated above. The initiation or generation of cracks on the surface of the test piece was observed under a 10× magnifying glass. The larger value of crack initiation times connotes better results.

(ii) Changes in Surface Conditions: A test piece was irradiated with UV light under the conditions stated above for 600 hours and 1,000 hours. Changes in the hue and cracking conditions of the test piece were observed before and after the irradiation, with the observations being expressed in five qualitative ranks with the lesser rankings meaning lesser observed changes in terms of reduced color or cracking.

(3) Tensile Test: The tensile strength and elongation of the specimens were determined according to ASTM D638.

EXAMPLE 1

A polyacetal resin (A) (Duracon®, a product of Polyplastics, Co., Ltd.) was blended with the core/shell polymer C-1 produced above and weathering stabilizers (B-1 and B-3) at a ratio as specified in Table 2. After mixing on a Henschel mixer, the mixture was melt-kneaded with the use of a 30-mm twin-screw extruder so as to give a composition in the form of pellets. These pellets were then processed on an injection molder under the aforementioned molding condition to thereby give molded test pieces, followed by the determining and evaluating of the glossiness and other properties thereof. Table 2 summarizes the results.

COMPARATIVE EXAMPLE 1

The procedure of the above Example 1 was repeated except that no core/shell polymer was added to the polyacetal resin. From the polyacetal composition thus obtained, test pieces were produced and evaluated. Table 3 summarizes the results.

EXAMPLES 2 TO 15

By using the core/shell polymers C-2 and C-3 produced by the above-mentioned methods, the polyacetal compositions as listed in Table 2 were prepared by the same method as the one employed in the above Example 1. Similarly, test pieces were produced therefrom and evaluated. Table 2 summarizes the results.

COMPARATIVE EXAMPLES 2 TO 9

Each composition, which was added a core/shell polymer alone, or a weathering stabilizer alone, or a combination of a weathering stabilizer (D) and a coloring component or calcium silicate to a polyacetal resin as shown in Table 3, was produced and evaluated in the same manner as the one described in the above Example 1. Table 3 summarizes the results.

COMPARATIVE EXAMPLES 10 TO 12

As Table 3 shows, compositions were produced and evaluated in the same manner as the one described in the above Example 1 by adding an ungrafted acryl resin instead of the component (B) or an acryl-modified graft copolymer free from any oxygen-containing polar group. Table 3 summarizes the results.

TABLE 2

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Polyacetal resin (parts by wt.) | 100 | 100 | 100 | 100 | 100 | 100 | 100 | 100 | 100 | 100 | 100 | 100 | 100 | 100 | 100 |
| Weathering (light) stabilizer | | | | | | | | | | | | | | | |
| *1 | B-1 | B-1 | B-1 | | B-1 | B-2 | B-1 | B-1 | B-1 | B-1 | B-1 | B-1 | B-1 | B-1 | B-1 |
| (pt. by wt.) | 0.3 | 0.3 | 0.3 | | 0.3 | 0.3 | 0.3 | 0.3 | 0.2 | 0.6 | 0.3 | 0.3 | 0.3 | 0.3 | 0.3 |
| *2 | B-3 | B-3 | | B-3 | B-4 | B-3 | B-3 | B-3 | B-3 | B-3 | B-3 | B-3 | B-3 | B-3 | B-3 |
| (pt. by wt.) | 0.3 | 0.3 | | 0.3 | 0.3 | 0.3 | 0.3 | 0.3 | 0.6 | 0.2 | 0.3 | 0.3 | 0.3 | 0.3 | 0.3 |
| Core/shell polymer | C-1 | C-2 | C-2 | C-2 | C-2 | C-2 | C-2 | C-2 | C-2 | C-2 | C-3 | C-3 | C-2 | C-3 | C-3 |
| (pt. by wt.) | 10 | 10 | 10 | 10 | 10 | 10 | 5 | 20 | 20 | 20 | 20 | 30 | 20 | 20 | 20 |
| Coloring component | | | | | | | | | | | | | | | |
| *3 | | | | | | | | | | | | | D-1 | D-1 | D-2 |
| (pt. by wt.) | | | | | | | | | | | | | 1 | 1 | 0.5 |
| Acryl resin | | | | | | | | | | | | | | | |
| *4 | | | | | | | | | | | | | | | |
| (pt. by wt.) | | | | | | | | | | | | | | | |
| Calcium silicate (pt. by wt.) | | | | | | | | | | | | | | | |
| Surface conditions | 1 | 1 | 1 | 1 | 1 | 1 | 2 | 1 | 1 | 1 | 1 | 1 | 1 | 1 | 1 |
| Glossiness (%) | | | | | | | | | | | | | | | |
| (45°—45°) | | | | | | | | | | | | | | | |
| specular | 14 | 14 | 15 | 16 | 14 | 15 | 21 | 10 | 9 | 10 | 12 | 10 | 8.0 | 10 | 10 |

TABLE 2-continued

|  | Example | | | | | | | | | | | | | | |
| --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 |
| grained | 3.8 | 3.4 | 3.6 | 3.6 | 3.6 | 3.6 | 4.1 | 2.8 | 2.7 | 2.8 | 3.2 | 2.8 | 2.8 | 3.4 | 2.7 |
| Weatherability test | | | | | | | | | | | | | | | |
| crack initiation (hr) | 620 | 820 | 620 | 560 | 760 | 660 | 700 | 880 | 880 | 820 | 820 | 920 | 1500> | 1200> | 1260 |
| surface conditions 600 hr | 2 | 1 | 2 | 2 | 1 | 2 | 1 | 1 | 1 | 1 | 1 | 1 | 1 | 1 | 1 |
| surface conditions 1000 hr | 4 | 1 | 4 | 4 | 1 | 3 | 2 | 1 | 1 | 1 | 1 | 1 | 1 | 1 | 1 |
| Tensile test | | | | | | | | | | | | | | | |
| strength (kg/cm$^2$) | 516 | 490 | 487 | 494 | 490 | 488 | 531 | 472 | 468 | 471 | 503 | 460 | 464 | 490 | 494 |
| elongation (%) | 78 | 86 | 88 | 85 | 88 | 84 | 75 | 95 | 89 | 92 | 91 | 105 | 88 | 78 | 81 |

TABLE 3

|  | Comp. Example | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Polyacetal resin (parts by wt.) | 100 | 100 | 100 | 100 | 100 | 100 | 100 | 100 | 100 | 100 | 100 | 100 |
| Weathering (light) stabilizer | | | | | | | | | | | | |
| *1 | B-1 | B-1 |  | B-1 | B-2 |  | B-1 | B-1 | B-1 | B-1 | B-1 | B-1 |
| (pt. by wt.) | 0.3 | 0.3 |  | 0.3 | 0.3 |  | 0.3 | 0.3 | 0.3 | 0.3 | 0.3 | 0.3 |
| *2 | B-3 |  | B-3 | B-4 | B-3 |  | B-3 | B-3 | B-3 | B-3 | B-3 | B-3 |
| (pt. by wt.) | 0.3 |  | 0.3 | 0.3 | 0.3 |  | 0.3 | 0.3 | 0.3 | 0.3 | 0.3 | 0.3 |
| Core/shell polymer |  |  |  |  |  | C-2 |  |  |  |  |  |  |
| (pt. by wt.) |  |  |  |  |  | 10 |  |  |  |  |  |  |
| Coloring component | | | | | | | | | | | | |
| *3 |  |  |  |  |  |  |  | D-1 | D-2 |  |  |  |
| (pt. by wt.) |  |  |  |  |  |  |  | 1 | 0.5 |  |  |  |
| Acryl resin | | | | | | | | | | | | |
| *4 |  |  |  |  |  |  |  |  |  | C'-1 | C'-2 | C'-3 |
| (pt. by wt.) |  |  |  |  |  |  |  |  |  | 10 | 10 | 10 |
| Calcium silicate (pt. by wt.) |  |  |  |  |  |  |  |  | 20 |  |  |  |
| Surface conditions | 5 | 5 | 5 | 5 | 5 | 1 | 5 | 5 | 2 | 4 | 4 | 4 |
| Glossiness (%) | | | | | | | | | | | | |
| (45°—45°) | | | | | | | | | | | | |
| specular | 75 | 75 | 74 | 76 | 74 | 14 | 79 | 77 | 27 | 52 | 55 | 65 |
| grained | 8.0 | 8.3 | 8.4 | 8.2 | 8.0 | 3.4 | 8.6 | 8.8 | 5.6 | 7.6 | 7.6 | 7.6 |
| Weatherability test | | | | | | | | | | | | |
| crack initiation (hr) | 360 | 260 | 200 | 300 | 240 | 280 | 420 | 400 | 300 | 300 | 300 | 400 |
| surface conditions 600 hr | 3 | 3 | 4 | 3 | 4 | 3 | 3 | 3 | 5 | 3 | 3 | 2 |
| surface condition 1000 hr | 5 | 5 | 5 | 5 | 5 | 5 | 5 | 5 | 5 | 5 | 5 | 5 |
| Tensile test | | | | | | | | | | | | |
| strength (kg/cm$^2$) | 595 | 600 | 605 | 590 | 590 | 492 | 500 | 597 | 528 | 575 | 570 | 515 |
| elongation (%) | 59 | 62 | 60 | 5.7 | 58 | 91 | 55 | 58 | 18 | 35 | 24 | 85 |

Notes:
*1 B-1: 2-[2-hydroxy-3,5-bis(α,α-dimethylbenzyl)phenyl]benzotriazole.
 B-2: 2-hydroxy-4-oxybenzylbenzophenone.
*2 B-3: bis(2,2,6,6-tetramethyl-4-piperidyl)sebacate.
 B-4: dimethyl succinate/1-(2-hydroxyethyl)-4-hydroxy-2,2,6,6-tetramethylpiperidine polycondensate.
*3 D-1: acetylene black.
 D-2: blue phthalocyanine pigment.
*4 Acryl resin:
 C'-1: P(MMA-HEMA). random copolymer of methyl methacrylate with hydroxyethyl methacrylate [MMA/HEMA: 8/2 (wt. %)].
 C'-2: P(MMA-GMA). random copolymer of methyl methacrylate with glycidylmethyl methacrylate [MMA/GMA: 8/2 (wt. %)].
 C'-3 Acryl crosslinked particles: P(BA-MMA)-g-PMMA, graft copolymer of random copolymer of butyl acrylate with methyl methacrylate and polymethyl methacrylate [(BA-MMA)/PMMA: 7/3 (wt %)].

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A moldable weather-resistant polyacetal resin composition exhibiting low surface gloss characteristics comprising a melt blend of:
   (A) 100 parts by weight of a polyacetal base resin;
   (B) between 0.01 to 5 parts by weight of a weather stabilizer; and
   (C) a surface gloss reducing effective amount of between 1 to 50 parts by weight of a core-shell polymer having a rubbery polymer as the core and a glassy vinyl copolymer having at least one oxygenic polar group as the shell.

2. The composition as in claim 1, wherein said weather stabilizer is at least one selected from the group consisting of benzotriazole derivatives, benzophenone derivatives, oxanilide derivatives, aromatic benzoates, cyanoacrylates and hindered amines.

3. The composition as in claim 1, wherein the weather stabilizer is a combination of a hindered amine compound together with one or more compounds selected from the group consisting of benzotriazole derivatives, benzophenone derivatives, oxanilide derivatives, aromatic benzoates and cyanoacrylates.

4. The composition as in claim 1, wherein said glassy vinyl copolymer shell is a (meth)acrylate of an alcohol having an oxygenic polar group.

5. The composition as in claim 4, wherein the oxygenic polar group is a hydroxyl group and/or a glycidyl group.

6. The composition as in claim 4, wherein the (meth-)acrylate) is hydroxyethyl methacrylate or glycidyl methacrylate.

7. The composition as in claim 1, wherein said core-shell polymer is an emulsion polymerization reaction product using an oligomeric surfactant.

8. The composition as in claim 1, wherein said core-shell polymer is an emulsion polymerization reaction product using a nonionic surfactant.

9. A composition as in claim 1, which further comprises (D) between 0.1 to 10 parts by weight of a colorant.

10. A molded polyacetal resin article having low surface gloss characteristics, which consists essentially of the composition of claim 1.

11. A molded article as in claim 10, which has a surface gloss of 30% or less.

12. A molded article as in claim 10, which includes at least a partly grained surface.

* * * * *